Aug. 18, 1925.
P. A. PROSPER
DUMPING VEHICLE
Filed Sept. 26, 1923
1,549,799
4 Sheets-Sheet 3
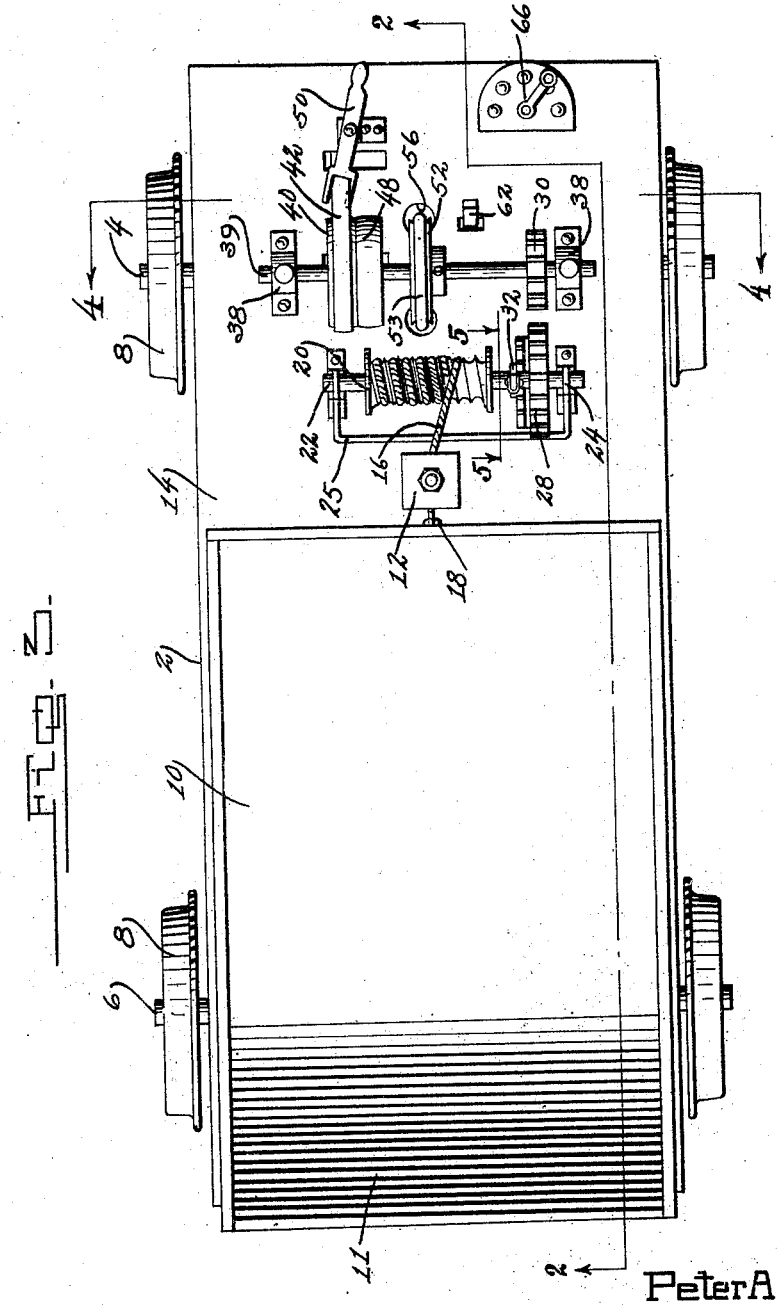
Inventor
Peter A. Prosper
By
Attorneys Aug. 18, 1925.
P. A. PROSPER
DUMPING VEHICLE
Filed Sept. 26, 1923
1,549,799
4 Sheets-Sheet 4
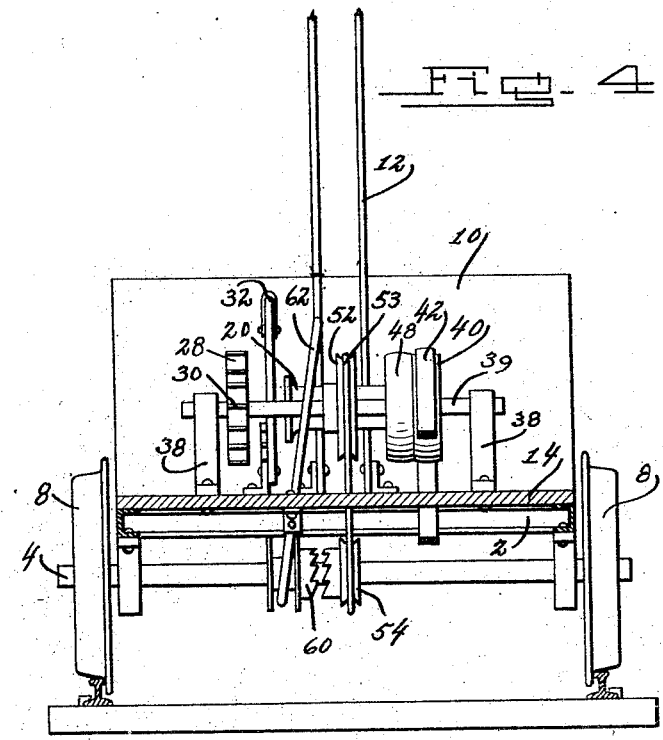
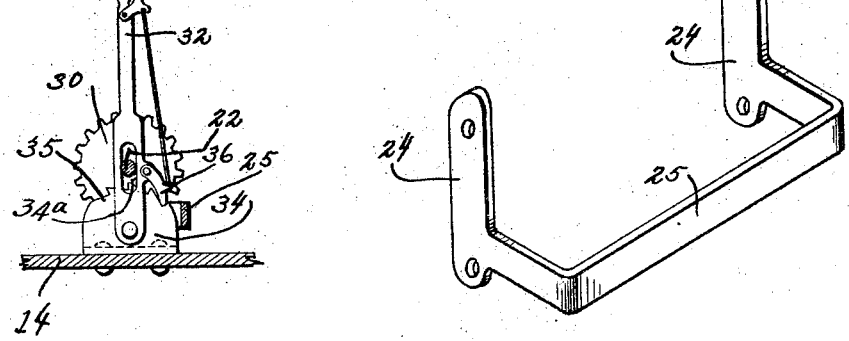
Inventor
Peter A. Prosper
By Jacobi & Jacobi
Attorneys Patented Aug. 18, 1925.

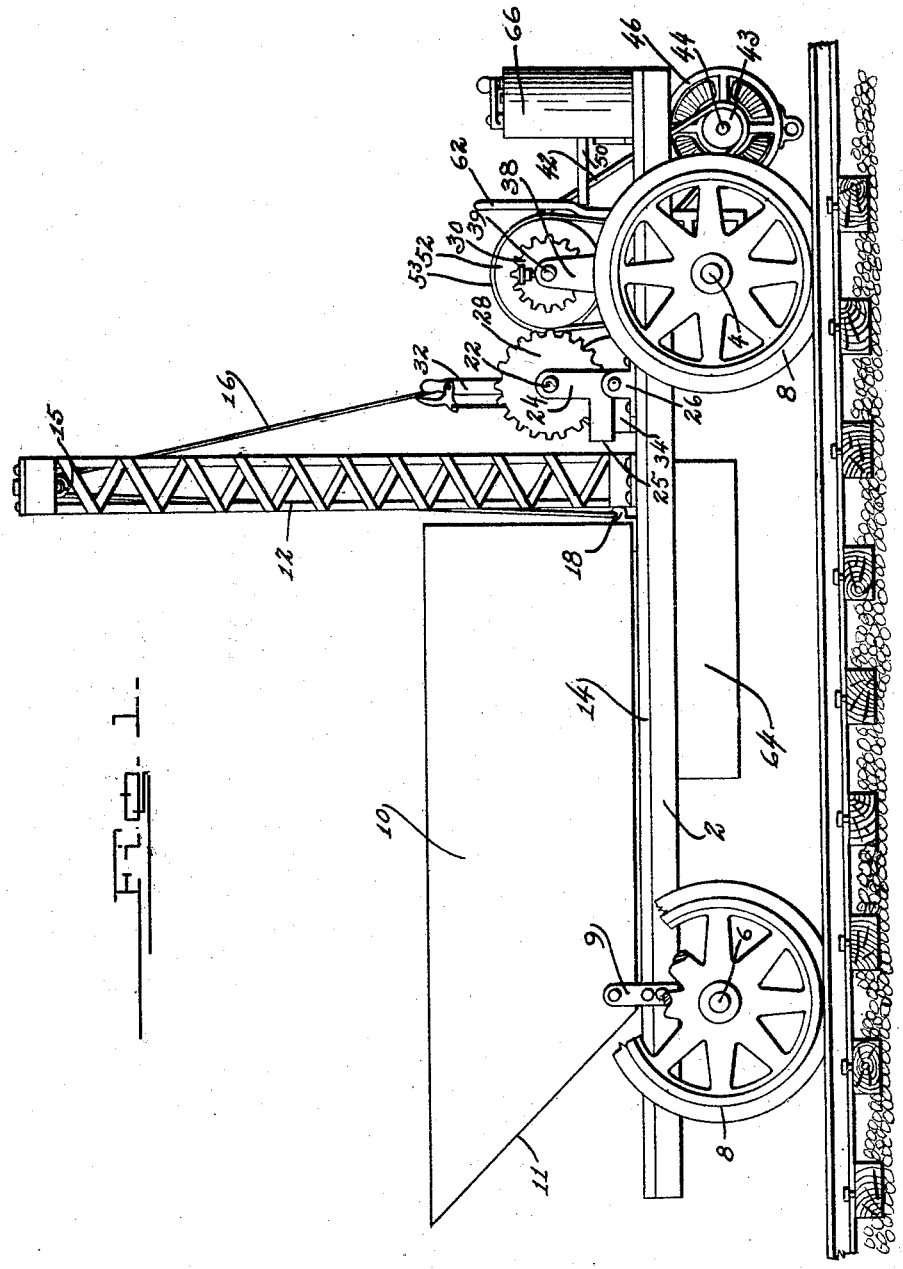

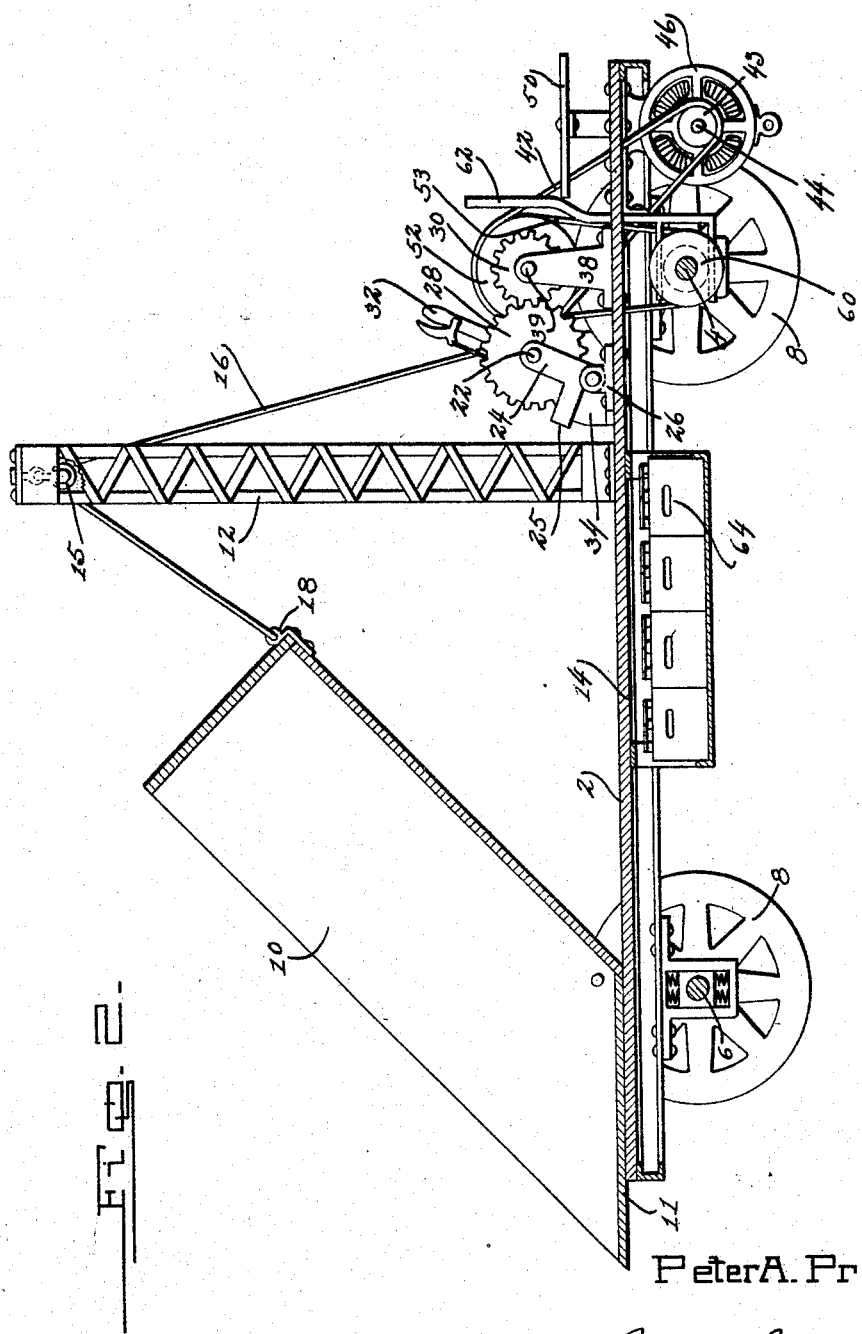

1,549,799

UNITED STATES PATENT OFFICE.

PETER A. PROSPER, OF DUBOIS, PENNSYLVANIA.

DUMPING VEHICLE.

Application filed September 26, 1923. Serial No. 664,924.

*To all whom it may concern:*

Be it known that PETER A. PROSPER, citizen of the United States, residing at Dubois, in the county of Clearfield and State of Penna., has invented certain new and useful Improvements in Dumping Vehicles, of which the following is a specification.

This invention relates to dumping vehicles and particularly to power driven dumping vehicles of a type which may be used in connection with road, railroad or mine work.

The particular object of my invention is to provide a dumping vehicle wherein the power mechanism for propelling the vehicle may be employed to operate the dumping mechanism.

Another feature resides in a construction wherein the propelling mechanism may be brought into operation to the exclusion of the dumping mechanism or vice versa, or in combination.

Further features reside in the general and specific arrangement of elements directed toward simplicity and practical combination of elements.

In the accompanying drawings—

Figure 1 is a side elevation of the machine;

Figure 2 is a longitudinal sectional view of the machine taken on line 2—2 of Figure 3;

Figure 3 is a plan view thereof;

Figure 4 is a transverse section taken on line 4—4 of Figure 3;

Figure 5 is a detail sectional view taken on line 5—5 of Figure 3; and

Figure 6 is a detail view of one of the elements of construction.

Referring now more particularly to the drawings by numerals of reference, 2 represents the chassis of the vehicle upon which is mounted the propelling and dumping mechanism, the front axle being shown at 4 and the rear axle at 6. As the vehicle may be adapted for railroad work as well as ordinary road work, the wheels 8 will of course necessarily be flanged when used upon rails.

Pivotally mounted in brackets 9 upon opposite sides of the chassis, near the rear end thereof, or otherwise suitably hinged is a dumping body 10, the delivery end of which may be inclined as at 11. The arrangement of the pivots for the dumping body is such that the weight thereof or the weight of the material therein maintains said body upon the chassis, from which position it must be positively rocked to dump the contents.

For the purpose of elevating the forward end of the dumping body to discharge the contents, I provide an operating mechanism which includes a vertical standard or tower 12 rigidly secured at its lower end to the floor 14 of the vehicle, said tower having suspended from its upper end as by a swivel, a pulley 15, over which passes a rope or cable 16, one end of which is secured as by a ring or eye 18 to the front panel of the dumping body, and near the lower edge thereof.

The opposite end is secured to a windlass or winding drum 20 fixed on a rotary shaft 22 journalled at its opposite ends in rock bars 24, pivoted at their lower ends in brackets 26, said bars 24 being rigidly connected to move in unison through a transverse tie bar 25. The shaft 22 has also keyed thereon near one end, a spur gear 28 which is adapted for cooperation under certain conditions with a similar driven gear 30, as will be later set forth. The shaft 22 is rocked back and forth to engage the gear 28 with the gear 30 through the medium of a lever 32 pivoted upon a bracket 34 on the floor of the vehicle below the shaft 22, any suitable connection between the shaft 22 and lever 32 being provided, but a simple construction will be to pass the shaft through an opening in the lever, as shown at 34$^a$. Also, suitable means may be provided, such as the segmental rack 35 fixed on the floor and cooperating with a latch 36 slidable on the lever, for locking the shaft in any position to which it may be rocked.

Journalled in fixed brackets 38 upon the floor and on opposite sides of the vehicle, is a rotary drive or power shaft 39, arranged forwardly of and parallel with the rock shaft 22, said shaft having fixed thereon the driven spur gear 30, above referred to as cooperating with the spur gear 28. The shaft 39 has also fixed thereon a pulley 40 which is driven through a belt 42 from the pulley 43 on the armature shaft 44 of a reversible electric motor 46 securely fastened on the floor of the vehicle. Arranged on the shaft 39, alongside the fixed drive pulley 40 is an idle pulley 48, onto which the drive belt 42 may be shifted by a belt shifter 50 when it is desired that the vehicle propelling and dumping mechanism will be at rest.

I further provide on the shaft 39, a pulley 52 which through a drive belt 53, and a pulley 54 fast on the front axle 4 drives the latter and thus propels the vehicle over the road or rails. The floor of the vehicle is of course provided with an opening 56 for the passage of the drive belt 53. Further, to permit of the operation of the dumping mechanism, without transmitting motion at the same time to the propelling mechanism, I provide the front axle 4 with a fixed clutch member and a movable clutch member 60 which may be operated from a clutch lever 62, the handle of which extends above the floor of the vehicle and is conveniently accessible to the person operating the machine, to engage or disengage the pulley 54 adjacent thereto. Under these circumstances, the pulley 54 would necessarily be loose on said axle. However, the same function may be performed if desired by arranging the pulley 54 in fixed relation to the axle, and providing a clutch in connection with the pulley 52 on the drive shaft 39, under which circumstances the said pulley 52 will be loose and the clutch device carried fast on shaft 39.

Power to operate the electric motor is furnished from storage batteries carried in battery boxes 64 suspended from the chassis or vehicle floor. Further, while I have referred to the motor as being arranged on the floor of the vehicle, in actual practice, it will be suspended by brackets beneath and from the floor or chassis.

The operation of the machine which should be readily observed from the foregoing is briefly as follows:

The motor being set in operation, power is transmited to the shaft 39 to rotate the same, and assuming the clutch member 60 and pulley 54 to be in engagement and the gears 30 and 28 to be out of engagement, the vehicle will be moved in a direction dependent upon the direction of movement of the reversible electric motor. It will now be assumed for purposes of illustration that the dumping body is filled with material to be dumped. When the vehicle arrives at the point where the material is to be discharged the clutch 60 is released and the vehicle stops, the shaft 39, however, being still driven. The belt 42 is now shifted onto the idle pulley 48 and the shaft ceases to rotate.

The rock shaft 22, through the lever 32, is rocked to bring the gears 30 and 28 into mesh and the belt 42 shifted from idle pulley 48 to fixed pulley 40, whereupon the winding drum 20 is rotated to wind the elevating cable 16 and thus elevate the forward end of the dump body 10 to discharge the contents, after which the motor is reversed and the body returned to initial or loading position. By suitable manipulation of the clutch, the body may be dumped while the vehicle is in motion, as will be easily seen.

The speed of the electric motor may be governed through a form of hand controller 66 such as is commonly employed on electric street railway cars.

Further, while I have shown and described certain arrangements of mechanism, I do not wish to be specifically limited as various departures may be resorted to within the scope of the following claims.

From the foregoing description of the construction of my improved apparatus, it will be seen that I have provided a simple, inexpensive and efficient means for carrying out the objects of the invention, and while I have particularly described the elements best adapted to perform the functions set forth, it is obvious that various changes in form, proportion, and in the minor details of construction may be resorted to, without departing from the spirit or sacrificing any of the principles of the invention.

Having thus described my invention, what I claim as new is:

1. In a dumping vehicle, in combination, a chassis including running gear, a dumping body pivoted on said chassis, a driven shaft mounted on the chassis, a second shaft, rocking bearings for the latter, gears on said shafts adapted for meshing when said second shaft is rocked to one position, means for rocking said bearings and second shaft, and means in connection with said second shaft and said dumping body to actuate the latter at predetermined times.

2. In a dumping vehicle, in combination with the chassis and running gear, including a driven axle, a dumping body pivoted on said chassis, an electric motor on said chassis, a shaft adapted to be driven by said motor journalled on said chassis, a second shaft, parallel with said first shaft, rocking bearings for said second shaft, a gear carried by each of said shafts and adapted to be relatively moved to engage and disengage them, means for rocking said second shaft, a winding drum on said second shaft, a tower on said chassis having a pulley in the upper end thereof, and a cable passing over said pulley and connected at its ends respectively with said winding drum and said dumping body.

In testimony whereof I affix my signature.

PETER A. PROSPER.